3,098,865
PROCESS FOR MAKING VINYL PHOSPHONIC ACID DICHLORIDE, VINYL PHOSPHONIC ACID, AND ESTERS THEREOF
Kurt Schimmelschmidt and Walter Denk, Frankfurt am Main, Germany, assignors to Farbwerke Hoechst Aktiengesellschaft vormals Meister Lucius & Brüning, Frankfurt am Main, Germany, a corporation of Germany
No Drawing. Filed Mar. 11, 1957, Ser. No. 645,028
Claims priority, application Germany Mar. 14, 1956
10 Claims. (Cl. 260—461)

The present invention relates to vinyl phosphonic acid, its derivatives and to a process of preparing them.

We have found that the reaction of vinyl phosphonic acid esters with phosphorus pentachloride at a raised temperature leads to the formation of the hitherto unknown vinyl phosphonic acid dichloride

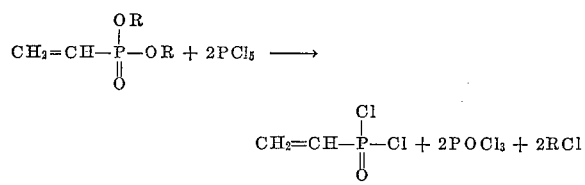

$$CH_2=CH-\underset{\underset{O}{\|}}{P}-Cl + 2POCl_3 + 2RCl$$

In carrying out the above reaction there may be used as reaction components vinyl phosphonic acid esters (alone or mixtures thereof) with lower aliphatic alcohols, such as ethanol, isopropanol or butanol, and more particularly vinyl phosphonic acid-bis-β-chlorethyl ester which may be used without previous purification and is easily obtained according to the process described in application Serial No. 620,581, now U.S. Patent No. 2,959,609. The above vinyl phosphonic acid dichloride may also be prepared using further esters, for example aromatic esters.

The reaction is carried out at a raised temperature above 100° C. and advisably below 160° C., preferably between about 115° and 145° C. In the reaction of this invention it has proved especially useful to select the reaction temperature so that the phosphorus oxychloride and the alkyl chloride formed as by-product be distilled off in the course of the reaction.

The vinyl phosphonic acid dichloride which is a valuable intermediate product can be obtained from the reaction mixture in a pure state by fractional distillation under reduced pressure.

It is known that β-chlorethyl-phosphonic acid-bis-β-chlorethyl ester can be converted into β-chlorethyl-phosphonic acid dichloride by means of phosphorus pentachloride (cf. Kabachnik, Romiskaja, Izvest. Akad. Nachr. UdSSR 42, 5736, Abstract: Chemistry Abstr. 42, 7211 (1948), K., R., Akad. Nachr. UdSSR. Int. Org. Khim Sintezy Org. Soedium Sbomik 2, 142–3 (1952), Abstract: Chem. Abstr. 48, 564 (1954)). It is very surprising and could not be foreseen that the reaction of this invention takes place smoothly, because the strongly activated double bond of vinyl phosphonic acid diesters or vinyl phosphonic acid dichloride enters easily into addition reactions; accordingly, it was to be assumed that the reaction would proceed in an indefinite manner.

It has also been found, and this is surprising, that the reaction described above leads to the formation of more uniform vinyl phosphonic acid dichloride associated with a considerably increased yield by operating in the presence of heavy metal halides as catalysts. To this end there may suitably be used the halides of copper, iron, cobalt and nickel, and especially the chlorides. More particularly, it has proved advantageous to use iron-3-chloride, copper-2-chloride or copper-1-chloride or mixtures of these salts.

In order to attain the desired effect, it is desirable that the above catalysts be added to the reaction mixture in a proportion of about 0.5% and preferably in a proportion of 0.7 to 1%, calculated upon the weight of the vinyl phosphonic acid dialkyl ester used. If desired the catalysts may also be used in a proportion outside the range indicated above. The amount of catalyst to be used may also depend on the purity of phosphorus pentachloride which is often contaminated by heavy metal salts. It is also possible to use the catalyst in a quantity of more than 1 percent.

It is often advantageous to use iron-3-chloride as a catalyst since the distillation residue can then more readily be removed from the reaction vessel.

It has additionally been found that the two chlorine atoms contained in vinyl phosphonic acid dichloride can further be reacted using compounds containing reactive groups. For example, the hitherto unknown vinyl phosphonic acid can be obtained by reacting vinyl phosphonic acid dichloride in inert solvents with water—preferably with the calculated amount of water—and then freeing, for example by evacuation, the vinyl phosphonic acid which precipitates in the solution, from the solvent and hydrogen chloride. This reaction may be carried out at a temperature above the freezing point of water, i.e. above 0° C. and preferably below 100° C., it being especially advantageous to operate at room temperature. The use of an excess of water has no influence upon the course of the reaction; in this case, it is, however, necessary to separate such excess from the reaction product.

In a manner analogous to that described above there may also be produced esters by reacting vinyl phosphonic acid dichloride with alcohols that likewise contain hydroxyl groups. In this case, however, there are used alcohols other than are contained in the starting vinyl phosphonic acid diester. This process is of special importance for the production of esters, such as vinyl phosphonic acid diphenyl ester, vinyl phosphonic acid diallyl ester, vinyl phosphonic acid didecyl ester, which are not accessible in another manner. These compounds are obtained like vinyl phosphonic acid in a high purity and with a good yield. It is evident that vinyl phosphonic acid dichloride may also be prepared from the vinyl phosphonic acid esters obtained as described above.

In carrying out the reaction of vinyl phosphonic acid dichloride with compounds containing hydroxyl groups, for example water, there may chiefly be used as inert solvents low-boiling halogenated hydrocarbons, such as methylene chloride, chloroform, carbon tetrachloride or dichlorethylene, low-boiling aliphatic hydrocarbons or benzene. It is suitable to use solvents that boil below 100° C. because the solvent can then readily be separated from vinyl phosphonic acid.

It is known that phosphonic acid chlorides may be hydrolyzed, but it could not be foreseen that the hydrolysis would take place smoothly in the reaction of this invention, since it was to be assumed that side reactions or polymerizations would occur as a result of the strongly activated double bond. Contrary to the production of vinyl phosphonic acid esters which in part have already been described in the literature, it was not possible to prepare or isolate the free monomeric vinyl phosphonic acid (cf. Kosolapoff "Organo-Phosphorus-Compounds," New York-London 1950, page 149).

The products obtainable by this invention in a high purity and with a good yield are new. They are valuable flame-proofing agents, especially vinyl phosphonic acid dichloride and vinyl phosphonic acid, and may be used for example in materials containing cellulose, and more especially in textile materials, and they may also be used as intermediate compounds. The new esters according to this invention, i.e. the esters of phenols or saturated or unsaturated aliphatic alcohols containing at least 3 carbon atoms, may also be used as flame-proofing agents.

The following examples serve to illustrate the invention, but they are not intended to limit it thereto:

*Example 1*

466 grams of vinyl phosphonic acid-bis-β-chloroethyl ester are heated to 130–140° C. while stirring, and 864 grams of phosphorus pentachloride are added within about 90 minutes while stirring vigorously. The major parts of the 1,2-dichlorethane and phosphorus oxychloride formed during the reaction distils permanently over. After the reaction is complete, the reaction mixture is distilled in vacuo. After the residual dichlorethane and phosphorus oxychloride have been removed by distillation, there are obtained 168 grams of vinyl phosphonic acid dichloride boiling at 59–61° C. under a pressure of 11 mm. of mercury; $n_D^{20}=1.4795$; there are also obtained 76 grams of a higher boiling substance (boiling point: 102–103° C. under a pressure of 11 mm. of mercury) and 29 grams of an undistillable residue.

*Example 2*

466 grams of pure vinyl phosphonic acid-bis-β-chlorethyl ester are stirred with 3.4 grams of copper-1-chloride, the mixture is heated to 130–140° C., and 840 grams of phosphorus pentachloride are introduced at that temperature within 90 minutes while stirring. The major part of the 1.2-dichlorethane and phosphorus oxychloride formed during the reaction distils permanently over. After the residual dichlorethane and phosphorus oxychloride have been removed, there are obtained by distillation in vacuo 216 grams of pure vinyl phosphonic acid dichloride (74.5% of the theoretical yield).

If under the same reaction conditions 4.6 grams of copper-2-chloride are used, there are obtained 203 grams of pure vinyl phosphonic acid dichloride. By using 4.6 grams of iron-3-chloride as catalyst, there are obtained 210 grams of vinyl phosphonic acid dichloride.

*Example 3*

1100 grams of crude vinyl phosphonic acid-bis-β-chlorethyl-ester of 86% purity are reacted as described in Example 1 with 11 grams of iron-3-chloride and 1980 grams of phosphorus pentachloride. 420 grams of pure vinyl phosphonic acid dichloride are obtained (71.6% of the theoretical yield).

*Example 4*

82 grams of vinyl phosphonic acid diethyl ester are stirred with 0.85 gram of cuprous chloride, the mixture is heated to 115–130° C., and 208.5 grams of phosphorus pentachloride are then introduced at that temperature within about 90 minutes while stirring. Ethyl chloride and phosphorus oxychloride distil permanently over. After the residual ethyl chloride and phosphorus oxychloride have been removed, there are obtained by distillation in vacuo 46 grams of pure vinyl phosphonic acid dichloride.

*Example 5*

150 grams of vinyl phosphonic acid di-(n)-propyl ester, 1.5 grams of iron-(III)-chloride and 342 grams of phosphorus pentachloride are reacted and worked up as described in Example 4. There are obtained 84 grams of pure vinyl phosphonic acid dichloride.

*Example 6*

150 grams of vinyl phosphonic acid di-(iso)-propyl ester, 1.5 grams of iron-(III)-chloride and 342 grams of phosphorus pentachloride are reacted and worked up as described in Example 4. There are obtained 78 grams of pure vinyl phosphonic acid dichloride.

*Example 7*

160 grams of vinyl phosphonic acid-di-(n)-butyl ester, 1.6 grams of iron-(III)-chloride and 314 grams of phosphorus pentachloride are reacted and worked up as described in Example 4. There are obtained 68 grams of vinyl phosphonic acid dichloride.

*Example 8*

145 grams of vinyl phosphonic acid dichloride are dissolved in 400 cc. of methylene chloride, and 36 grams of water are added dropwise to the solution at 10–20° C. while stirring vigorously. Hydrolyzation is complete after about 4 hours of stirring at 20° C. The heavy vinyl phosphonic acid deposits on the bottom of the vessel and can easily be separated from methylene chloride. For removing adhering methylene chloride and hydrogen chloride, the separated vinyl phosphonic acid is subjected to a treatment in vacuo. In this manner there are obtained 102 grams of vinyl phosphonic acid in the form of a viscous water-soluble oil having a density of $D^{20}=1.398$, $n_D^{20}=1.4710$.

*Example 9*

145 grams of vinyl phosphonic acid dichloride are introduced at 0–10° C. within 1 hour, while stirring, into a mixture of 500 cc. of anhydrous benzene, 140 grams of allyl alcohol and 202 grams of triethyl amine, and stirring is continued for a further 4 hours at +15° C. The salt which has precipitated is separated and the filtrate is fractionated by distillation in vacuo. In this manner there are obtained 157 grams of pure vinyl phosphonic acid di-allyl ester. The substance is new and boils at 60–61° C. under a pressure of 0.15 mm. of mercury; $n_D^{20}=1.4600$.

*Example 10*

145 grams of vinyl phosphonic acid dichloride are introduced, at 15–20° C. within 1 hour, while stirring, into a mixture of 600 cc. of anhydrous benzene and 260 grams of 2-ethyl-hexanol, and stirring is continued for a further 4 hours at room temperature. The reaction mixture is fractionated by distillation in vacuo. There are obtained 268 grams of pure vinyl phosphonic acid bis-(2-ethyl)-hexyl ester. The substance is new and boils at 108–112° C. under a pressure of 0.01 mm. to 0.03 mm. of mercury; $n_D^{20}=1.4480$.

*Example 11*

72.5 grams of vinyl phosphonic acid dichloride are introduced at 30–40° C., while stirring, into a mixture of 300 cc. of anhydrous benzene and 190 grams of n-decyl-alcohol, and stirring is continued for a further 4 hours at room temperature. By fractionation in vacuo there are obtained 164 grams of pure vinyl phosphonic acid bis-(n)-decyl ester boiling at 151–155° C. under a pressure of 0.01–0.03 mm. of mercury; $n_D^{20}=1.4505$. The substance is new.

*Example 12*

145 grams of vinyl phosphonic acid dichloride are introduced at 60–70° C., within 3 hours, while stirring, into a suspension of 232 grams of sodium phenolate in 1000 cc. of toluene and stirring is continued for a further 3 hours at 70° C. After cooling, the separated sodium chloride is filtered off with suction and the filtrate is fractionated by distillation in vacuo. There are obtained 152 grams of pure vinyl phosphonic acid diphenyl ester boiling at 146–146.5° C. under a pressure of 0.2 mm. of mercury; $n_D^{20}=1.5568$. The substance is new.

The following examples are given to demonstrate the flame-proofing effect of the compounds according to this invention.

*Example 13*

A 25% ammoniacal solution (pH about 8) of vinyl phosphonic acid is applied in a proportion of 10–20% by weight onto textile material containing cellulose, and dried. The textile material is heated within a short time to 130–150° C., and then possesses a good flame-proofing effect.

Example 14

Textile material containing cellulose is impregnated with a solution of vinyl phosphonic acid diallyl ester (10–20%) in volatile organic solvents and after-treated at 130–150° C. The material so treated exhibits a good flame-proofing effect.

Example 15

Textile material containing cellulose is impregnated with a solution of vinyl phosphonic acid dichloride (10–20%) in inert volatile organic solvents, then treated with ammonia and after-treated at 130–150° C. The textile material so treated exhibits a good flame-proofing effect.

The percentage figures given in Examples 13 to 15 indicate the quantity of the active substance.

We claim:

1. A process which comprises reacting an ester of vinyl phosphonic acid at a temperature in the range from 100 to 160° C. with phosphorus pentachloride.

2. A process which comprises reacting an ester of vinyl phosphonic acid at a temperature in the range from 100 to 160° C. with phosphorus pentachloride and reacting the vinyl phophonic acid dichloride thus obtained with water in a solvent inert towards the reaction to yield vinyl phosphonic acid.

3. A process which comprises reacting an alcohol ester of vinyl phosphonic acid at a temperature in the range from 100 to 160° C. with phosphorus pentachloride and reacting the vinyl phosphonic acid dichloride thus obtained in a solvent inert towards the reaction with a different hydrocarbon alcohol containing from three to ten carbon atoms and at most one olefinic bond to yield vinyl phosphonic acid diesters.

4. A process which comprises reacting an ester of vinyl phosphonic acid at a temperature in the range from 100 to 160° C. with phosphorus pentachloride in the presence of a heavy metal halide.

5. A process which comprises reacting an ester of vinyl phosphonic acid at a temperature in the range from 100 to 160° C. with phosphorus pentachloride in the presence of ferric chloride.

6. A process which comprises reacting an ester of vinyl phosphonic acid at a temperature in the range from 100 to 160° C. with phosphorus pentachloride in the presence of 0.7 to 1% of a heavy metal halide, the percentage data being calculated upon the weight of the vinyl phosphonic acid diester used as starting material.

7. A process which comprises reacting an ester of vinyl phosphonic acid at a temperature in the range from 115 to 145° C. with phosphorus pentachloride.

8. A process which comprises reacting an ester of vinyl phosphonic acid at a temperature in the range from 100 to 160° C. with phosphorus pentachloride in the presence of about 0.7 to 1% of a heavy metal halide, calculated upon the weight of the vinyl phosphonic acid diester used as starting material, and reacting the vinyl phosphonic acid dichloride thus obtained with water in a solvent inert towards the reaction to yield vinyl phosphonic acid.

9. A process which comprises reacting an ester of vinyl phosphonic acid at a temperature in the range from 100 to 160° C. with phosphorus pentachloride in the presence of about 0.7 to 1% of a heavy metal halide, calculated upon the weight of the vinyl phosphonic acid diester used as starting material, and reacting the vinyl phosphonic acid dichloride thus obtained in a solvent inert towards the reaction with a hydrocarbon alcohol containing three to ten carbon atoms and at most one olefinic bond, said alcohol being different from the alcohol component of the vinyl phosphonic acid diester used as starting material, to yield a vinyl phosphonic acid diester.

10. Vinyl phosphonic acid diphenyl ester.

References Cited in the file of this patent

UNITED STATES PATENTS

| | | |
|---|---|---|
| 2,471,472 | Woodstock | May 31, 1949 |
| 2,535,173 | Tawney | Dec. 26, 1950 |
| 2,535,175 | Tawney | Dec. 26, 1950 |
| 2,844,618 | Johnson et al. | July 22, 1958 |
| 2,957,931 | Hamilton et al. | Oct. 25, 1960 |
| 3,064,030 | Chadwick et al. | Nov. 13, 1962 |

OTHER REFERENCES

Kosolapoff: "Organo-Phosphorus Compounds," John Wiley and Sons, N.Y. (1950), pages 62, 65, 66, 73, 138 and 149.

Toy et al.: "J. Am. Chem. Soc.," 76, pages 2191–2195, 1954.

Gefter: Translation RJ–619 of "Uspekhi Khim," 25, No. 2, pages 162–198 (1956), page 26.

Gefter et al.: "Doklady Akad. Nauk S.S.S.R.," 114, 541–4 (1957) (in Russian) (see also "Chem. Abst., vol. 52, col. 295, Jan. 10, 1958).